United States Patent

Tanuma et al.

Patent Number: 5,759,698
Date of Patent: Jun. 2, 1998

[54] LAMINATED GLASS

[75] Inventors: Itsuo Tanuma, Sayama; Yasuhiro Morimura; Hidefumi Kotsubo, both of Kodaira, all of Japan

[73] Assignee: Bridgestone Corporation, Tokyo, Japan

[21] Appl. No.: 648,821

[22] Filed: May 16, 1996

[30] Foreign Application Priority Data

May 17, 1995 [JP] Japan ................ 7-118242
Nov. 30, 1995 [JP] Japan ................ 7-313382

[51] Int. Cl.⁶ ................ B32B 17/10; C03C 27/12
[52] U.S. Cl. ................ 428/442; 428/441
[58] Field of Search ................ 428/441, 442

[56] References Cited

U.S. PATENT DOCUMENTS

| | | | |
|---|---|---|---|
| 3,582,455 | 6/1971 | De Lap et al. | 428/214 |
| 4,600,627 | 7/1986 | Honda et al. | 428/203 |
| 4,619,973 | 10/1986 | Smith, Jr. | 525/329.9 |
| 4,663,228 | 5/1987 | Bolton et al. | 428/334 |

FOREIGN PATENT DOCUMENTS

| | | |
|---|---|---|
| 476 330 | 3/1992 | European Pat. Off. |
| 57-196747 | 12/1982 | Japan . |
| J6 0264348A | 12/1985 | Japan . |
| 2 259 669 | 3/1993 | United Kingdom . |

*Primary Examiner*—D. S. Nakarani
*Attorney, Agent, or Firm*—Sughrue, Mion, Zinn, Macpeak & Seas, PLLC

[57] ABSTRACT

Laminated glass has sheets of plate glass with a bonding layer intervening therebetween for integration. The bonding layer is formed of a resin composition comprising (A) a terpolymer of ethylene, vinyl acetate, and an acrylate and/or methacrylate monomer, (B) a terpolymer of ethylene, vinyl acetate, and maleic acid and/or maleic anhydride, (C) a terpolymer of ethylene, an acrylate and/or methacrylate monomer, and maleic acid and/or maleic anhydride or (D) an ionomer resin in the form of an ethylene-methacrylic acid copolymer with a metal ion binding molecules thereof as a thermosetting resin, an organic peroxide, and a silane coupling agent. The resin composition is thermoset between the glass sheets.

7 Claims, No Drawings

LAMINATED GLASS

BACKGROUND OF THE INVENTION

1. Field of the Invention

This invention relates to laminated glass known as non-shattering glass for use as windshields and side window glass in automobiles and glazing in buildings.

2. Prior Art

In the prior art laminated glass or nonshattering glass, polyvinyl butyral resins have been most commonly used as the intermediate layer for bonding sheets of plate glass. The polyvinyl butyral resins, however, have several drawbacks since they are thermoplastic. (1) Because of a relatively low softening point, heat will allow sheets of plate glass to shift from each other and formation of air bubbles can be observed after lamination. (2) Because of moisture sensitivity, long-term storage in a high temperature atmosphere can result in gradual whitening from the periphery and lowering of adhesion to glass. (3) Resistance to impact fractures depends on temperature so that a sudden decline of penetration resistance is observed in the temperature region in excess of room temperature, that is, beyond about 30° C.

To solve the above-mentioned drawbacks of polyvinyl butyral resins, we proposed in Japanese Patent Application Kokai (JP-A) No. 196747/1982 a thermosetting resin comprising an ethylene-vinyl acetate copolymer in admixture with an organic peroxide. The thermosetting resin is interposed between sheets of plate glass and thermoset for integration, yielding a laminated glass.

When safety which is one of crucial purposes of laminated glass is taken into account, the laminated glass of our previous patent does not satisfy a wide spectrum of impact resistance and penetration resistance.

SUMMARY OF THE INVENTION

An object of the present invention is to provide a safe laminated glass which improves the impact resistance and penetration resistance of prior art laminated glass and which is unlikely to shatter even when it was fractured by external forces.

We attempted to prepare a thermosetting resin composition by blending (A) a terpolymer of ethylene, vinyl acetate, and an acrylate and/or methacrylate monomer, (B) a terpolymer of ethylene, vinyl acetate, and maleic acid and/or maleic anhydride, (C) a terpolymer of ethylene, an acrylate and/or methacrylate monomer, and maleic acid and/or maleic anhydride or (D) an ionomer resin in the form of an ethylene-methacrylic acid copolymer having a metal ion binding molecules thereof with an organic peroxide and a silane coupling agent. We have found that when this resin composition is sandwiched between sheets of plate glass and thermoset therebetween for integration, there is obtained a laminated glass which is significantly improved in impact resistance and penetration resistance.

Accordingly, the present invention provides a laminated glass comprising sheets of plate glass which are integrated through a resin layer. The resin layer is formed of a resin composition comprising at least one thermosetting resin selected from the group consisting of (A), (B), (C), and (D), an organic peroxide, and a silane coupling agent. The resin composition is thermoset between the glass plates.

DESCRIPTION OF THE PREFERRED EMBODIMENTS

The laminated glass of the invention includes sheets of plate glass with a bonding layer of a thermosetting resin composition interposed and thermoset therebetween for integration. The thermosetting resin composition used herein is comprised of a thermosetting resin, an organic peroxide, and a silane coupling agent while the thermosetting resin is (A) a terpolymer of ethylene, vinyl acetate, and an acrylate and/or methacrylate monomer, (B) a terpolymer of ethylene, vinyl acetate, and maleic acid and/or maleic anhydride, (C) a terpolymer of ethylene, an acrylate and/or methacrylate monomer, and maleic acid and/or maleic anhydride or (D) an ionomer resin in the form of an ethylene-methacrylic acid copolymer with a metal ion binding molecules thereof.

The terpolymer (A) preferably contains 0.01 to 20% by weight, more preferably 0.05 to 5% by weight of an acrylate and/or methacrylate monomer which may be either randomly bonded in the backbone of the terpolymer or grafted to side chains thereof. Impact resistance would be low if the content of acrylate and/or methacrylate monomer is less than 0.01% by weight. Glass transparency and impact resistance would be adversely affected if the content of acrylate and/or methacrylate monomer exceeds 20% by weight. The acrylate and methacrylate monomers used herein include monomers of acrylates and methacrylates, for example, methyl acrylate, methyl methacrylate, ethyl acrylate, and glycidyl methacrylate.

In terpolymer (A), the content of vinyl acetate is preferably 4 to 50% by weight, more preferably 14 to 45% by weight from the standpoints of glass transparency and strength properties. If the content of vinyl acetate is less than 4% by weight, transparency would be low after crosslinking and curing at elevated temperatures. Impact resistance and penetration resistance would be low if the content of vinyl acetate exceeds 50% by weight.

The terpolymer (B) preferably contains 0.01 to 10% by weight, more preferably 0.05 to 5% by weight of maleic acid and/or maleic anhydride which may be either randomly bonded in the backbone of the terpolymer or grafted to side chains thereof. Impact resistance would be low if the content of maleic acid and/or maleic anhydride is less than 0.01% by weight. Glass transparency and impact resistance would be adversely affected if the content of maleic acid and/or maleic anhydride exceeds 10% by weight.

In terpolymer (B), the content of vinyl acetate is preferably 10 to 50% by weight, more preferably 14 to 45% by weight from the standpoints of glass transparency and strength properties. If the content of vinyl acetate is less than 10% by weight, transparency would be low after crosslinking and curing at elevated temperatures. Impact resistance and penetration resistance would be low if the content of vinyl acetate exceeds 50% by weight.

The terpolymer (C) preferably contains 0.01 to 10% by weight, more preferably 0.05 to 5% by weight of maleic acid and/or maleic anhydride which may be either randomly bonded in the backbone of the terpolymer or grafted to side chains thereof. Impact resistance would be low if the content of maleic acid and/or maleic anhydride is less than 0.01% by weight. Glass transparency and impact resistance would be adversely affected if the content of maleic acid and/or maleic anhydride exceeds 10% by weight.

In terpolymer (C), the content of acrylate and/or methacrylate monomer is preferably 5 to 50% by weight, more preferably 14 to 45% by weight from the standpoints of glass transparency and strength properties. If the content of acrylate and/or methacrylate monomer is less than 5% by weight, transparency would be low after crosslinking and curing at elevated temperatures. Impact resistance and penetration resistance would be low if the content of acrylate and/or methacrylate monomer exceeds 50% by weight. The acrylate and methacrylate monomers used herein include monomers of acrylates and methacrylates, for example, methyl acrylate, methyl methacrylate, ethyl acrylate, and glycidyl methacrylate.

The ionomer resin (D) is an ethylene-methacrylic acid copolymer. Molecules of the copolymer are bound by a metal ion. The metal ions include metal cations of sodium, zinc, magnesium, and lithium. The ethylene-methacrylic acid copolymer preferably has a methacrylic acid content of 1 to 30% by weight, more preferably 5 to 25% by weight. If the content of methacrylic acid is less than 1% by weight, ionic crosslinking effect would be reduced, detracting from the impact resistance and penetration resistance of laminated glass. Ethylene-methacrylic acid copolymers with a methacrylic acid content of more than 30% by weight would be too hard and thus less workable, with laminated glass losing impact resistance and penetration resistance.

Preferably the ethylene-methacrylic acid copolymer of ionomer resin (D) has a degree of ionization of 5 to 80% by the metal ion. A degree of ionization of 7 to 70% is more preferred. With a degree of ionization of less than 5%, ionic crosslinking effect would be short, detracting from the impact resistance and penetration resistance and lowering the transparency of laminated glass. Copolymers with a degree of ionization of more than 80% would be too hard and thus low in impact resistance and workability. The use of sodium ion is recommended because of improved transparency.

In the manufacture of laminated glass according to the invention, an organic peroxide is blended as a curing agent for the thermosetting resin. It may be any of organic peroxides which decompose at a temperature of 100° C. or higher to generate radicals, preferably organic peroxides having a decomposition temperature affording a half life of 10 hours of 70° C. or higher when stability upon blending is taken into account. Examples of the peroxide which can be used herein include 2,5-diemethylhexane-2,5-dihydroperoxide, 2,5-dimethyl-2,5-di(t-butylperoxy) hexane-3, di-t-butyl peroxide, t-butylcumyl peroxide, 2,5-dimethyl-2,5-di(t-butylperoxy)hexane, dicumyl peroxide, α, α'-bis(t-butyl-peroxyisopropyl) benzene, n-butyl-4,4-bis(t-butylperoxy)-valerate, 2,2-bis(t-butylperoxy)butane, 1,1-bis (t-butyl-peroxy) cyclohexane, 1,1-bis(t-butylperoxy)-3,3,5-trimethyl-cyclohexane, t-bu-tyl peroxybenzoate, and benzoyl peroxide. The organic peroxides may be used alone or in admixture of two or more in amounts of 0.1 to 10 parts by weight per 100 parts by weight of the thermosetting resin.

If necessary, a polymerization inhibitor such as hydroquinone, hydroquinone monomethyl ether, p-benzoquinone, and methylhydroquinone may be added in an amount of less than about 5 parts by weight per 100 parts by weight of the thermosetting resin for the purpose of improving stability. Other useful additives include coloring agents, UV absorbers, anti-oxidants, anti-discoloring agents.

According to the invention, a silane coupling agent is blended for the purpose of improving the adhesion of thermosetting resin to glass. Examples of the silane coupling agent which can be used herein include γ-chloropropylmethoxysilane, vinyltrichlorosilane, vinyltriethoxysilane, vinyltris (β-methoxyethoxy) silane, γ-methacryloxypropyltrimethoxysilane, β-(3,4-epoxycyclohexyl)ethyl-trimethoxysilane, γ-glycidoxypropyltrimethoxysilane, vinyl-triacetoxysilane, γ-mercaptopropyltrimethoxysilane, γ-amino-propyltriethoxysilane, and N-β-(aminoethyl)-γ-aminopropyl-trimethoxysilane. The silane coupling agents may be used alone or in admixture of two or more in amounts of 0.01 to 5 parts by weight per 100 parts by weight of the thermosetting resin.

For the purpose of enhancing the initial modulus and improving the penetration resistance of the thermosetting resin, an acryloxy group-containing compound, a methacryloxy group-containing compound or an allyl group-containing compound may be added to the thermosetting resin.

The compounds which can be used for this purpose are generally derivatives of acrylic acid and methacrylic acid, for example, esters thereof. Exemplary alcohol residues of esters are alkyl groups such as methyl, ethyl, dodecyl, strearyl, and lauryl as well as cyclohexyl, tetrahydrofurfuryl, aminoethyl, 2-hydroethyl, 3-hydroxypropyl, and 3-chloro-2-hydroxypropyl groups. Also useful are esters of acrylic acid and methacrylic acid with polyhydric alcohols such as ethylene glycol, triethylene glycol, and polyethylene glycol. Examples of the allyl group-containing compound include diallyl phthalate, diallyl fumarate, diallyl maleate, triallyl cyanurate, and triallyl isocyanurate. These compounds may be used alone or in admixture of two or more in amounts of 0.1 to 50 parts by weight, preferably 0.5 to 30 parts by weight per 100 parts by weight of the thermosetting resin. Less than 0.1 part of the compound would be ineffective for improving mechanical strength. More than 50 parts of the compound would detract from the ease of preparation of an adhesive composition and its film forming ability as a layer intervening between sheets of plate glass.

Since the intervening or bonding layer is based on a thermosetting resin selected from polymers (A) to (D) each having optimum contents of respective components as mentioned above, the laminated glass of the invention is improved in transparency, impact resistance and penetration resistance. Since an organic peroxide and an optional additive in the form of an acryloxy, methacryloxy or allyl group-containing compound are blended to provide a crosslinked structure, improvements are made in penetration resistance, resistance to hot humidity, and transparency. Since a silane coupling agent is blended to improve adhesiveness upon thermosetting, a greater initial bonding force and a thermally stable bonding force are observed.

When the laminated glass of the invention is used as windshields and side window glass in automobiles and glazing in buildings, it not only exhibits superior properties including transparency, resistance to hot humidity, and bonding force, but is also improved in impact resistance and penetration resistance as demonstrated by the fact that little shattering occurs even when it is ruptured by an external force. The invention thus provides safe laminated glass.

The laminated glass of the invention is prepared, for example, by mixing the selected thermosetting resin with the necessary components at a temperature of 60 to 120° C. and press forming the mixture into a sheet having a desired gage, typically 0.1 to 1.0 mm, especially 0.4 to 0.8 mm. The resin sheet is then sandwiched between sheets of plate glass. The laminated glass, if desired in a rubber bag, is compressed for precuring at a temperature of 60 to 100° C. under atmospheric pressure and finally treated at a temperature of 100° to 170° C., especially 120° to 150° C. for about 10 to 90 minutes for curing.

EXAMPLE

Examples of the present invention are given below by way of illustration and not by way of limitation. Unless otherwise stated, all parts and percents are by weight.

Examples 1–3

A resin composition was prepared by blending the components shown in Table 1 and milling the blend in a roll mill at 80° C. The composition was pressed into a resin sheet with a gage of 0.76 mm. The resin sheet was sandwiched between a pair of float glass plates with a gage of 3 mm which had been cleaned and dried. The laminated glass was contained in a rubber bag, which was evacuated to vacuum, and pre-compressed at a temperature of 80° C. The pre-compressed laminated glass was placed in an oven where it was heated at 130° C. for 30 minutes. There were obtained laminated glass samples which were highly transparent and free of optical distortion.

TABLE 1

| Components (pbw) | E 1 | E 2 | E 3 | CE 1 |
|---|---|---|---|---|
| Bondfast 2A | 100 | — | — | — |
| Bondfast 2B | — | 100 | — | — |
| Bondfast G | — | — | 100 | — |
| Ultrathene 634 | — | — | — | 100 |
| Triallyl isocyanurate | 5 | — | — | 5 |
| Neopentylglycol dimethacrylate | — | 5 | — | — |
| trimethylolpropane triacrylate | — | — | 5 | — |
| 1,1-bis(t-butylperoxy)-3,3,5-trimethylcyclohexane | 2 | 2 | 2 | 2 |
| γ-methacryloxypropyl-trimethoxysilane | 1 | 1 | 1 | 1 |

Bondfast is a trade name of ethylene-vinyl acetate-glycidyl methacrylate terpolymer commercially available from Sumitomo Chemical K.K.

Bondfast 2A: vinyl acetate content 8%, glycidyl methacrylate content 3%

Bondfast 2B: vinyl acetate content 5%, glycidyl methacrylate content 12%

Ultrathene 634 is a trade name of ethylene-vinyl acetate copolymer (vinyl acetate content 26%) commercially available from Toso K.K.

The laminated glass samples of Examples 1 to 3 and Comparative Example 1 were subject to a shot-bag test according to JIS R3205 (1983) at a drop height of 120 cm. No substantial cracks were noticeable for each of the inventive samples. In the laminated glass of Comparative Example 1, substantial cracks occurred on the glass surface.

The laminated glass samples were also subject to a transparency test using a hazeometer manufactured by Suga Tester K.K. All the inventive and comparative samples had a haze value of less than 2, showing good transparency.

The test results are shown in Table 2.

TABLE 2

| | E 1 | E 2 | E 3 | CE 1 |
|---|---|---|---|---|
| Haze, % | 1.5 | 1.9 | 1.4 | 0.5 |
| Shot-bag test @ drop height 120 cm | pass no cracks | pass no cracks | pass no cracks | rejected cracked |

Examples 4–6

A resin composition was prepared by blending the components shown in Table 3 and milling the blend in a roll mill at 80° C. The composition was pressed into a resin sheet with a gage of 0.76 mm. The resin sheet was sandwiched between a pair of float glass plates with a gage of 3 mm which had been cleaned and dried. The laminated glass was contained in a rubber bag, which was evacuated to vacuum, and pre-compressed at a temperature of 80° C. The pre-compressed laminated glass was placed in an oven where it was heated at 130° C. for 30 minutes. There were obtained laminated glass samples which were highly transparent and free of optical distortion.

TABLE 3

| Components (pbw) | E 4 | E 5 | E 6 |
|---|---|---|---|
| MODIC E-100H | 100 | — | — |
| MODIC E-300H | — | 100 | — |
| MODIC E-300S | — | — | 100 |
| Triallyl isocyanurate | 5 | — | — |
| Neopentylglycol dimethacrylate | — | 5 | — |
| trimethylolpropane triacrylate | — | — | 5 |
| 1,1-bis(t-butylperoxy)-3,3,5-trimethylcyclohexane | 2 | 2 | 2 |
| γ-methacryloxypropyl-trimethoxysilane | 1 | 1 | 1 |

MODIC is a trade name of ethylene-vinyl acetate-maleic anhydride terpolymer commercially available from Mitsubishi Yuka K.K.

MODIC E-100H: vinyl acetate content about 16%, maleic anhydride content about 0.5%

MODIC E-300H: vinyl acetate content about 25%, maleic anhydride content about 0.5%

MODIC E-300S: vinyl acetate content about 24%, maleic anhydride content about 0.5%

The laminated glass samples were subject to a shot-bag test according to JIS R3205 (1983) at a drop height of 120 cm, finding no substantial cracks.

The laminated glass samples were also subject to a transparency test using a hazeometer manufactured by Suga Tester K.K. All the samples had a haze value of less than 2, showing good transparency.

The test results are shown in Table 4.

TABLE 4

| | E 4 | E 5 | E 6 |
|---|---|---|---|
| Haze, % | 0.9 | 1.1 | 1.8 |
| Shot-bag test @ drop height 120 cm | pass no cracks | pass no cracks | pass no cracks |

Examples 7–9

A resin composition was prepared by blending the components shown in Table 5 and milling the blend in a roll mill at 80° C. The composition was pressed into a resin sheet with a gage of 0.76 mm. The resin sheet was sandwiched between a pair of float glass plates with a gage of 3 mm which had been cleaned and dried. The laminated glass was contained in a rubber bag, which was evacuated to vacuum, and pre-compressed at a temperature of 80° C. The pre-compressed laminated glass was placed in an oven where it was heated at 130° C. for 30 minutes. There were obtained laminated glass samples which were highly transparent and free of optical distortion.

TABLE 5

| Components (pbw) | E 7 | E 8 | E 9 |
|---|---|---|---|
| Bondain LX4110 | 100 | — | — |
| Bondain HX8290 | — | 100 | — |
| Bondain AX8390 | — | — | 100 |
| Triallyl isocyanurate | 5 | — | — |
| Neopentylglycol dimethacrylate | — | 5 | — |
| trimethylolpropane triacrylate | — | — | 5 |
| 1,1-bis(t-butylperoxy)-3,3,5-trimethylcyclohexane | 2 | 2 | 2 |
| γ-methacryloxypropyl-trimethoxysilane | 1 | 1 | 1 |

Bondain is a trade name of ethylene-ethyl acrylate-maleic anhydride terpolymer commercially available from Sumitomo Chemical K.K.

Bondain LX4110: ethylene content 91%, ethyl acrylate content 8%, maleic anhydride content 1%

Bondain HX8290: ethylene content 80%, ethyl acrylate-maleic anhydride content 20%

Bondain AX8390: ethylene content 68%, ethyl acrylate content 30%, maleic anhydride content 2%

The laminated glass samples were subject to a shot-bag test according to JIS R3205 (1983) at a drop height of 120 cm, finding no substantial cracks.

The laminated glass samples were also subject to a transparency test using a hazeometer manufactured by Suga Tester K.K. All the samples had a haze value of 2 or less, showing good transparency.

The test results are shown in Table 6.

TABLE 6

|  | E 7 | E 8 | E 9 |
|---|---|---|---|
| Haze, % | 2.0 | 1.7 | 1.9 |
| Shot-bag test @ drop height 120 cm | pass no cracks | pass no cracks | pass no cracks |

Examples 10–13

A resin composition was prepared by blending the components shown in Table 7 and milling the blend in a roll mill at 80° C. The composition was pressed into a resin sheet with a gage of 0.8 mm. The resin sheet was sandwiched between a pair of float glass plates with a gage of 3 mm which had been cleaned and dried. The laminated glass was contained in a rubber bag, which was evacuated to vacuum, and pre-compressed at a temperature of 80° C. The pre-compressed laminated glass was placed in an oven where it was heated at 130° C. for 30 minutes. It is noted that in Example 13, a 0.8-mm gage sheet of an ionomer resin was immersed for 30 seconds in a 5% toluene solution containing an organic peroxide, a silane coupling agent, and one of acryloxy, methacryloxy and allyl group-containing compounds (trimethylolpropane triacrylate was selected herein) at 80° C. before this resin sheet was sandwiched between a pair of float glass plates.

There were obtained laminated glass samples which were highly transparent and free of optical distortion.

TABLE 7

| Components (pbw) | E 10 | E 11 | E 12 | E 13 |
|---|---|---|---|---|
| Himilan 1856 | 100 | — | — | — |
| Himilan 1707 | — | 100 | — | 100 |
| Himilan 1855 | — | — | 100 | — |
| Triallyl isocyanurate | 5 | — | — | — |
| Neopentylglycol dimethacrylate | — | 5 | — | — |
| trimethylolpropane triacrylate | — | — | 5 | (5) |
| 1,1-bis(t-butylperoxy)-3,3,5-trimethyl-cyclohexane | 2 | 2 | 2 | (5) |
| γ-methacryloxypropyl-trimethoxysilane | 1 | 1 | 1 | (1) |

Himilan is a trade name of ionomer resin commercially available from Mitsui duPont Chemical K.K. Himilan 1856 and 1707 are sodium ion type ionomer resins. Himilan 1855 is a zinc ion type ionomer resin.

Himilan 1856: methacrylic acid content 5%, degree of ionization by sodium ion 40%

Under the heading of Example 13, numbers in parentheses mean that an ionomer resin sheet was immersed in a 5% toluene solution having the indicated parts by weight of additive agents mixed therein at 80° C. for 30 seconds.

The laminated glass samples were subject to a shot-bag test according to JIS R3205 (1983) at a drop height of 120 cm, finding no substantial cracks.

The laminated glass samples were also subject to a transparency test using a hazeometer manufactured by Suga Tester K.K. All the samples had a haze value of 1.6 or less, showing good transparency.

The test results are shown in Table 8.

TABLE 8

|  | E 10 | E 11 | E 12 | E 13 |
|---|---|---|---|---|
| Haze, % | 0.9 | 0.7 | 1.5 | 1.6 |
| Shot-bag test @ drop height 120 cm | pass no cracks | pass no cracks | pass no cracks | pass no cracks |

Although some preferred embodiments have been described, many modifications and variations may be made thereto in the light of the above teachings. It is therefore to be understood that within the scope of the appended claims, the invention may be practiced otherwise than as specifically described.

We claim:

1. A laminated glass comprising sheets of plate glass which are integrated through a resin layer, said resin layer being formed of a thermosetting resin composition comprising at least one resin selected from the group consisting of (A) a terpolymer of ethylene, vinyl acetate, and an acrylate and/or methacrylate monomer, (B) a terpolymer of ethylene, vinyl acetate, and maleic acid and/or maleic anhydride, (C) a terpolymer of ethylene, an acrylate and/or methacrylate monomer, and maleic acid and/or maleic anhydride, and (D) an ionomer resin in the form of an ethylene-methacrylic acid copolymer with a metal ion binding molecules thereof, an organic peroxide, and a silane coupling agent, said resin composition being thermoset between the glass sheets.

2. The laminated glass of claim 1 wherein said thermosetting resin composition comprises terpolymer (A) and has a vinyl acetate content of 4 to 50% by weight and an acrylate and/or methacrylate monomer content of 0.01 to 20% by weight.

3. The laminated glass of claim 1 wherein said thermosetting resin composition comprises terpolymer (B) and has a vinyl acetate content of 10 to 50% by weight and a maleic acid and/or maleic anhydride content of 0.01 to 10% by weight.

4. The laminated glass of claim 1 wherein said thermosetting resin composition comprises terpolymer (C) and has an acrylate and/or methacrylate monomer content of 5 to 50% by weight and a maleic acid and/or maleic anhydride content of 0.01 to 10% by weight.

5. The laminated glass of claim 1 wherein said thermosetting resin composition comprises the ethylene-methacrylic acid copolymer of ionomer resin (D) and has a methacrylic acid content of 1 to 30% by weight and a degree of ionization of 5 to 80% by the metal ion.

6. The laminated glass of claim 1 wherein said resin composition contains 100 parts by weight of the thermosetting resin, 0.1 to 10 parts by weight of the organic peroxide, and 0.01 to 5 parts by weight of the silane coupling agent.

7. The laminated glass of claim 1 wherein said resin composition further contains per 100 parts by weight of the thermosetting resin, 0.1 to 50 parts by weight of at least one member selected from the group consisting of an acryloxy group-bearing compound, a methacryloxy group-bearing compound, and an allyl group-bearing compound.

* * * * *